United States Patent
Kao et al.

(10) Patent No.: US 8,411,042 B2
(45) Date of Patent: *Apr. 2, 2013

(54) ELECTRONIC DEVICE

(75) Inventors: Yih-Feng Kao, Tao Yuan (TW);
Chih-Feng Hsu, Tao Yuan (TW); John C. Wang, Tao Yuan (TW); Chin-Chung Shih, Tao Yuan (TW); Chun-Yao Hou, Tao Yuan (TW)

(73) Assignee: HTC Corporation, Taoyuan County (TW)

( * ) Notice: Subject to any disclaimer, the term of this patent is extended or adjusted under 35 U.S.C. 154(b) by 973 days.

This patent is subject to a terminal disclaimer.

(21) Appl. No.: 12/106,342

(22) Filed: Apr. 21, 2008

(65) Prior Publication Data

US 2008/0284745 A1 Nov. 20, 2008

(30) Foreign Application Priority Data

May 15, 2007 (TW) ................. 96117289 A

(51) Int. Cl.
*G06F 3/041* (2006.01)

(52) U.S. Cl. ....................... 345/173; 345/174

(58) Field of Classification Search .......... 345/173–183; 178/18.01–19.04
See application file for complete search history.

(56) References Cited

U.S. PATENT DOCUMENTS

| | | | |
|---|---|---|---|
| 5,610,629 A | 3/1997 | Baur | |
| 5,945,980 A | 8/1999 | Moissev et al. | |
| 6,611,258 B1 | 8/2003 | Tanaka et al. | |
| 6,628,269 B2 * | 9/2003 | Shimizu | 345/173 |
| 2002/0080123 A1 * | 6/2002 | Kennedy et al. | 345/173 |
| 2004/0004680 A1 | 1/2004 | Kim | |
| 2004/0017363 A1 * | 1/2004 | Nakanishi et al. | 345/173 |
| 2004/0027340 A1 | 2/2004 | Muraoka et al. | |
| 2004/0179001 A1 * | 9/2004 | Morrison et al. | 345/179 |
| 2005/0052582 A1 * | 3/2005 | Mai | 349/12 |
| 2005/0083308 A1 * | 4/2005 | Homer et al. | 345/173 |
| 2006/0097991 A1 * | 5/2006 | Hotelling et al. | 345/173 |
| 2006/0158840 A1 | 7/2006 | Canova, Jr. et al. | |
| 2006/0197750 A1 | 9/2006 | Kerr et al. | |
| 2007/0103446 A1 * | 5/2007 | Chien et al. | 345/173 |
| 2008/0070635 A1 * | 3/2008 | Bang et al. | 455/566 |

FOREIGN PATENT DOCUMENTS

| | | |
|---|---|---|
| CN | 1567360 | 1/2005 |
| CN | 1614624 | 5/2005 |
| CN | 1717618 | 1/2006 |

(Continued)

OTHER PUBLICATIONS

"1st Office Action of China counterpart application", issued on Apr. 24, 2009, p. 1-p. 12.
"Office Action of Taiwan Counterpart Application" issued on May 25, 2010, p. 1-p. 4.

(Continued)

*Primary Examiner* — Hong Zhou
(74) *Attorney, Agent, or Firm* — Jianq Chyun IP Office

(57) ABSTRACT

An electronic device that has a sensing function with no-hindrance touching is provided. The electronic device includes a casing, a touch display and a processor. The casing has an opening, and the touch display is disposed inside the opening for receiving an operation of an input tool. The touch display has a sensing surface which allows the input tool to slide smoothly over the sensing surface and the casing. The processor is electrically coupled to the touch display, and the user interface displayed by the touch display is determined by the processor. As a result, the convenience of operating the electronic device is increased.

17 Claims, 15 Drawing Sheets

FOREIGN PATENT DOCUMENTS

| | | |
|---|---|---|
| CN | 2840178 | 11/2006 |
| EP | 0927949 | 7/1999 |
| EP | 1628196 | 2/2006 |
| TW | M241746 | 8/2004 |

OTHER PUBLICATIONS

"1st Office Action of China counterpart application of co-pending application", issued on May 8, 2009, p. 1-p. 7.

* cited by examiner

ELECTRONIC DEVICE

CROSS-REFERENCE TO RELATED APPLICATION

This application claims the priority benefit of Taiwan application serial no. 96117289, filed on May 15, 2007. All disclosure of the Taiwan application and co-pending US patent application to be filed concurrently by the same applicant, entitled "ELECTRONIC DEVICE", which claims the priority benefit of Taiwan application serial no. 96117287, filed on May 15, 2007, are incorporated herein by reference.

BACKGROUND OF THE INVENTION

1. Field of the Invention

The present invention relates to an electronic device. More particularly, the present invention relates to an electronic device capable of identifying the type of the input tool.

2. Description of the Related Art

In the fast-paced life of modern people, it has become a common habit to emphasize convenience and efficiency for daily tasks. Take handheld devices such as cell phones or personal digital assistants (PDAs) for example, in addition to features such as powerful functions, light weight, and compact design, the users generally expect to open and execute the necessary functions in a very short time. The expectation is especially true for frequently used functions like editing short messages or looking up communication records. The convenience of handheld devices would be improved if the users can open some frequently used functions quickly when manipulating the handheld devices.

In order to meet the above demand, manufacturers of handheld devices install hot keys corresponding to specific frequently used functions on the casing or keyboard of handheld device at the design stage. Therefore, when the user presses a hot key, a corresponding frequently used function can be opened quickly in order to shorten the time spent on searching and opening the function. For example, some manufacturers install a button for opening the photo-shooting function on the side of cell phones so that the photo-shooting function of a cell phone can be activated immediately when the user presses the button.

However, in the increasing trend toward light weight and compactness, the space for the manufacturers to install hot keys is quite limited. Besides, the expectation of the users for exterior design of handheld devices cannot be ignored. In order to ensure the design and shape of handheld devices conform to aesthetic standards, manufacturers have to limit the number of hot keys at the design stage. Consequently only a few hot keys are available for meeting the requirement of quick activation of frequently used functions.

As a result, only a few functions of a handheld device have corresponding hot keys for quick activation by the user. When the user wants to execute a function without corresponding hot key, the user has to open the function by manipulating the menu of the handheld device. Because generally the menu of a handheld device has a tree structure, the user may need to find the function item he/she needs by selecting and entering several sub-menus. For some frequently used functions, if every time they have to be executed in the way described above, a lot of time would be wasted and there would be significant inconvenience in using the handheld device.

SUMMARY OF THE INVENTION

Accordingly, the present invention is directed to an electronic device with a smooth sensing surface and an electronic device with a no-hindrance sensing surface in order to improve the convenience of operation.

According to an embodiment of the present invention, an electronic device with a sensing function with no-hindrance touching is provided. The electronic device includes a casing, a touch display, and a processor. The casing has an opening. The touch display is disposed in the opening for receiving the operation of an input tool. The touch display further has a sensing surface. The input tool can slide across the joint of the sensing surface and the casing without hindrance. The processor is electrically coupled to the touch display and is configured for determining the user interface displayed on the touch display.

According to another embodiment of the present invention, an electronic device with a sensing function with no-hindrance touching is provided. The electronic device includes a casing, a touch display, and a processor. The casing has an opening. The touch display is disposed in the opening for receiving the operation of an input tool. The touch display has a sensing surface. The input tool can slide across the joint of the sensing surface and the casing without hindrance. The processor is electrically coupled to the touch display and is configured for identifying the type of the input tool.

The present invention is able to identify the type of the input tool according to characteristics such as the contact area, contact pressure, detected area, temperature, or detected image of the input tool when the input tool contacts with or approaches the touch sensing means of the electronic device. The present invention may automatically switch to and display a user interface according to the type of the input tool. In addition, the present invention may automatically open or close specific functions according to the type of the input tool. As a result, the present invention improves the efficiency of the switching of user interfaces and the convenience of operating the electronic device. Moreover, the sensing surface and the casing of the electronic device are substantially equivalent to a single smooth surface. The input tool can slide freely on the electronic device without being hindered by the casing, thus further improving the convenience of operating the electronic device.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
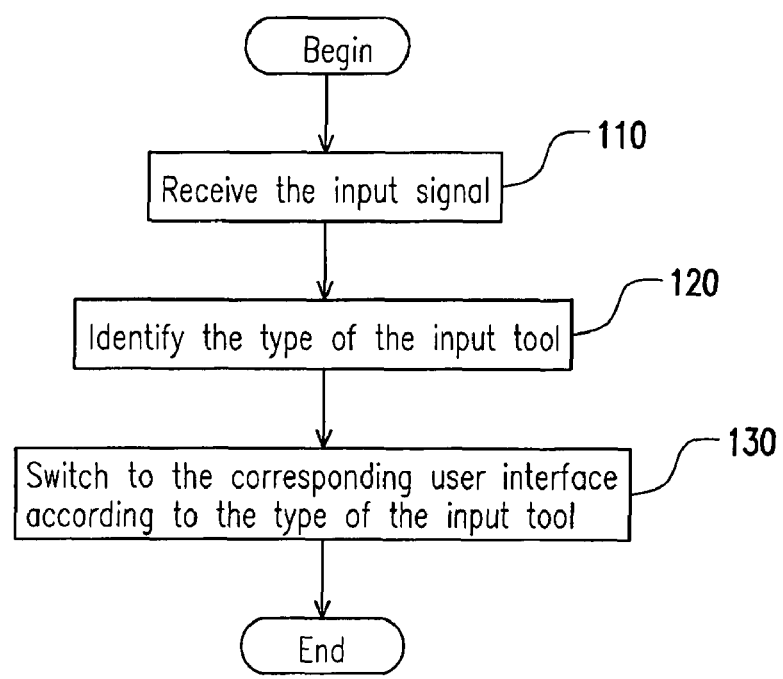
FIG. 1 is the flow chart of a method for operating a user interface according to an embodiment of the present invention.

Reference will now be made in detail to the present embodiments of the invention, examples of which are illustrated in the accompanying drawings. Wherever possible, the same reference numbers are used in the drawings and the description to refer to the same or like parts.

On a conventional handheld device, the user can only press hot keys to open some specific functions quickly. However, the number of hot keys on a handheld device is limited. If a handheld device can provide a user interface displaying multiple frequently used functions at the same time so that the user can use them rapidly, it would certainly improve the convenience of using the handheld device. The present invention includes a method for operating a user interface and a handheld device using the method, which are developed based on the aforementioned prospect. For a clear description of the present invention, embodiments are discussed to demonstrate the implementation of the present invention.

FIG. 1 is a flow chart of a method for operating a user interface according to an embodiment of the present invention. Please refer to FIG. 1. This embodiment discusses the detailed steps about how a handheld device switches to a corresponding user interface automatically according to different types of the input tool when a user operates the handheld device. The handheld device may be a cell phone, a PDA, or a smart phone, etc. The type of the handheld device is not limited in the present invention.

First, at step 110, the handheld device receives an input signal in a user interface when a user operates the handheld device via an input tool. Next, at step 120, the handheld device identifies the type of the input tool according to the area, pressure, temperature, or image detected by the touch sensing means when the input tool contacts or approaches the touch sensing means of the handheld device. Finally, as shown by step 130, the handheld device switches to and displays the corresponding user interface according to the type of the input tool.

In this embodiment, the handheld device displays different corresponding user interfaces according to the various types of input tools. For convenience, the following embodiments of the present invention focus on an example of differentiating two different types of input tools, such as a stylus and a finger of the user. The following embodiments of the present invention also focus on the flow of switching to the corresponding user interface according to these two types of input tools. In the scope of the present invention, there may be an arbitrary number of input tool types.

In the following embodiments of the present invention, the user interface corresponding to the stylus is a general user interface which includes all the functions of the handheld device, while the user interface corresponding to the finger is a frequently used function interface which displays part of the functions of the handheld device. The functions displayed on the frequently used function interface may be preset according to the habit or requirement of the user.

This embodiment includes a number of methods for identifying the type of the input tool. Each aforementioned identification method requires different hardware design, as shown in the block diagrams of handheld devices in FIG. 2A to FIG. 2D, which are discussed below.

Figure 2A:
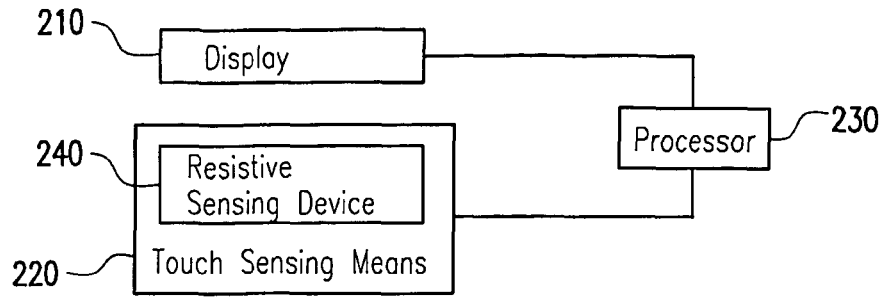
FIG. 2A to FIG. 2D are block diagrams of a handheld device capable of switching user interface according to an embodiment of the present invention.

The handheld device in FIG. 2A includes a display 210, a touch sensing means 220, and a processor 230. The display 210 displays a user interface. The touch sensing means 220 may be a touch panel for detecting the operation of the input tool and provides an input signal according to the operation of the input tool. The processor 230 is coupled to the display 210 and the touch sensing means 220 for identifying the type of the input tool and switch to the corresponding user interface according to the type of the input tool.

Figure 3A:
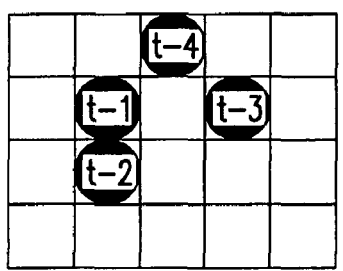
FIG. 3A and FIG. 3B are schematic diagrams showing the contact area of input tools according to an embodiment of the present invention.
Figure 3B:
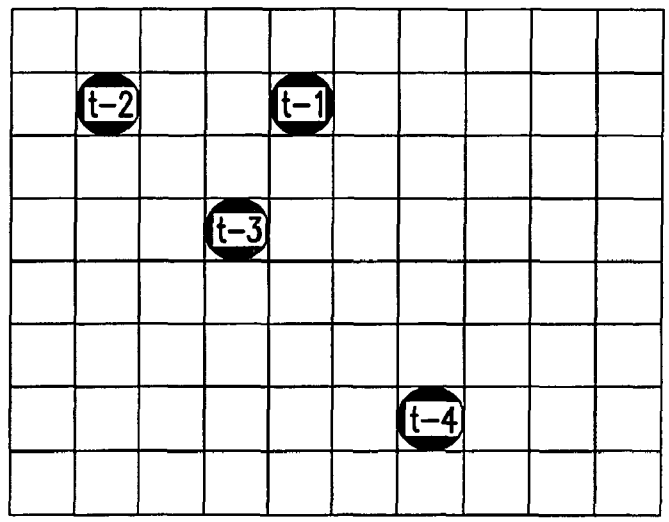

The touch sensing means 220 in FIG. 2A includes a resistive sensing device 240. A resistive sensing device can detect the contact position and contact pressure of an input tool, therefore the input signal provided by the touch sensing means 220 includes information such as the contact position and contact pressure of the input tool. Please note that a resistive sensing device can only provide the input signal of a single contact point at a time and the contact point is distributed within the contact area of the input tool and the resistive sensing device, as shown in FIG. 3A and FIG. 3B. The contact area of a stylus is smaller and therefore the contact points are more concentrated, as the contact points t-1, t-2, t-3, and t-4 shown in FIG. 3A. The contact area of a finger is larger and therefore the contact points are more distributed, as the contact points t-1, t-2, t-3, and t-4 shown in FIG. 3B. Because a resistive sensing device can only provide the input signal of a single contact point at a time, the processor 230 has to keep recoding the information of the input signal in a specific duration. Next, the processor 230 calculates the variation range of the information, and then identifies the type of the input tool according to the size of the variation range.

Take the contact points t-1, t-2, t-3, and t-4 in FIG. 3A and FIG. 3B for example, assume that the input signal generated by the contact point t-i is $(X_i, Y_i, P_i)$, wherein i may be 1, 2, 3, or 4. $X_i$ is the X coordinate of the contact position of the contact point t-i. $Y_i$ is the Y coordinate of the contact position of the contact point t-i. $P_i$ is the contact pressure of the contact point t-i. The processor 230 may calculate the average values of the contact position and the contact pressure as follows.

Average X coordinate: $X_a=(X_1+X_2+X_3+X_4)/4$

Average Y coordinate: $Y_a=(Y_1+Y_2+Y_3+Y_4)/4$

Average pressure: $P_a=(P_1+P_2+P_3+P_4)/4$

Next, the variation ranges of the contact position and the contact pressure may be calculated as follows.

Figure 4A:
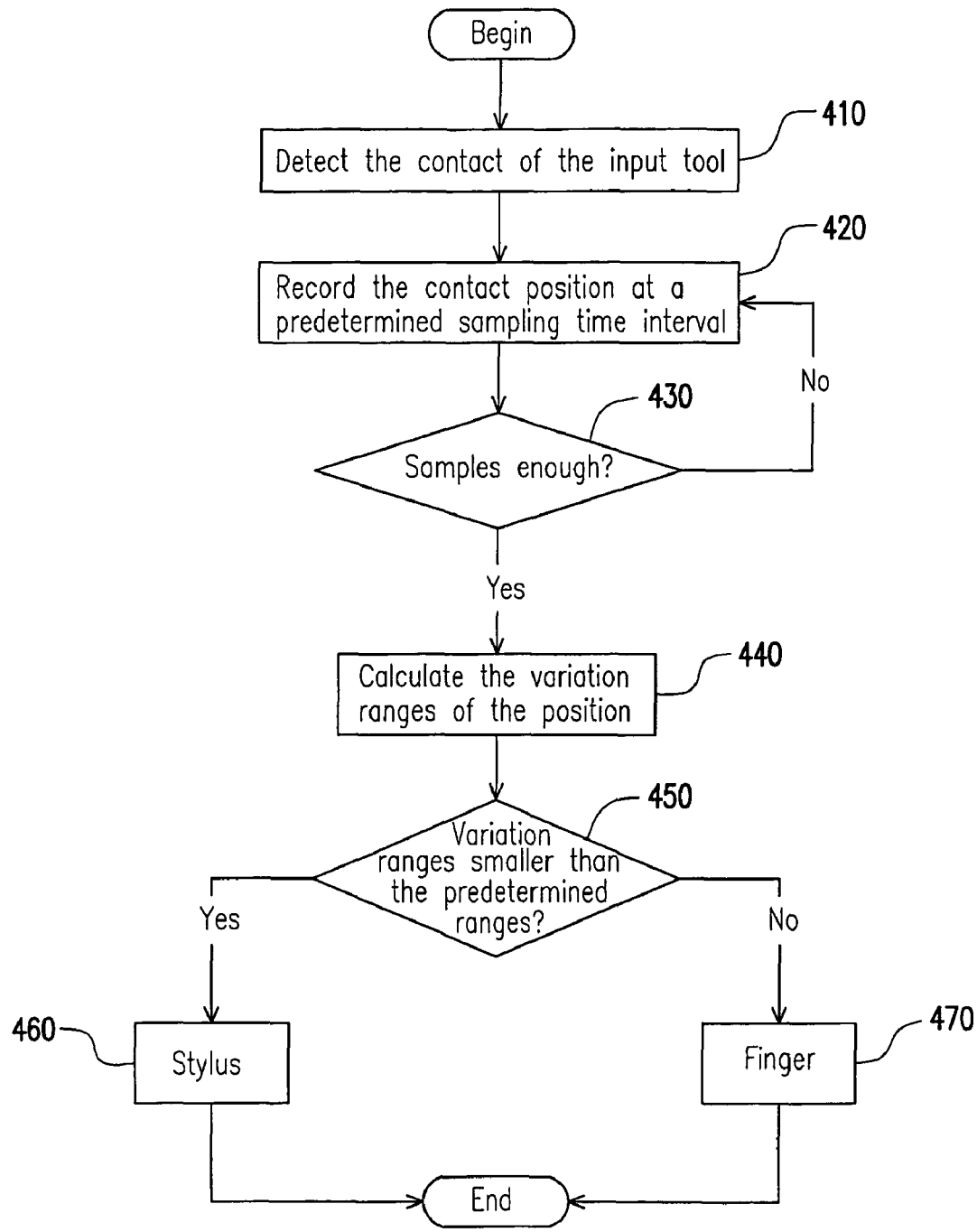
FIG. 4A to FIG. 4C are flow charts of a method for identifying the type of an input tool according to an embodiment of the present invention.
Figure 4B:
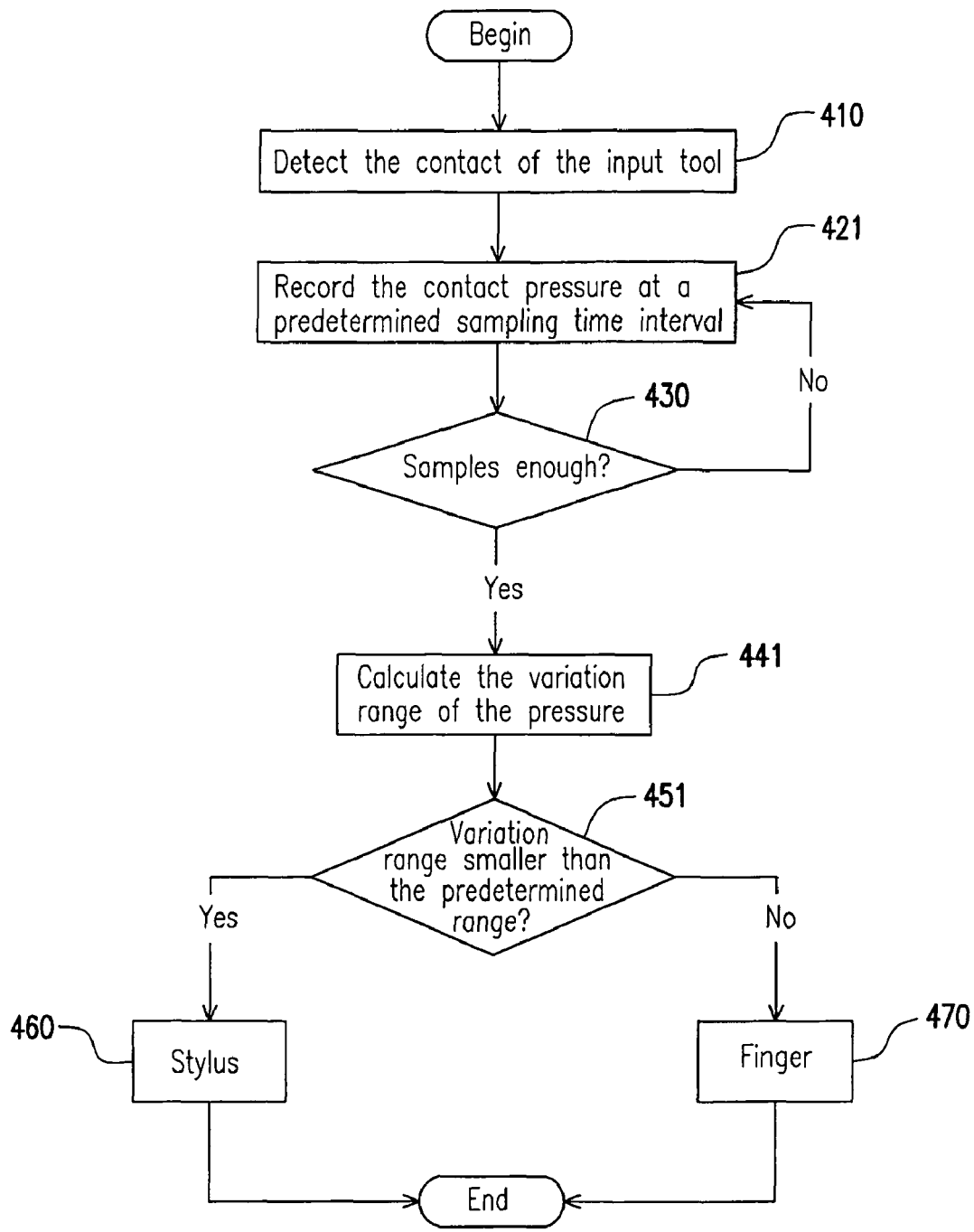
Figure 4C:
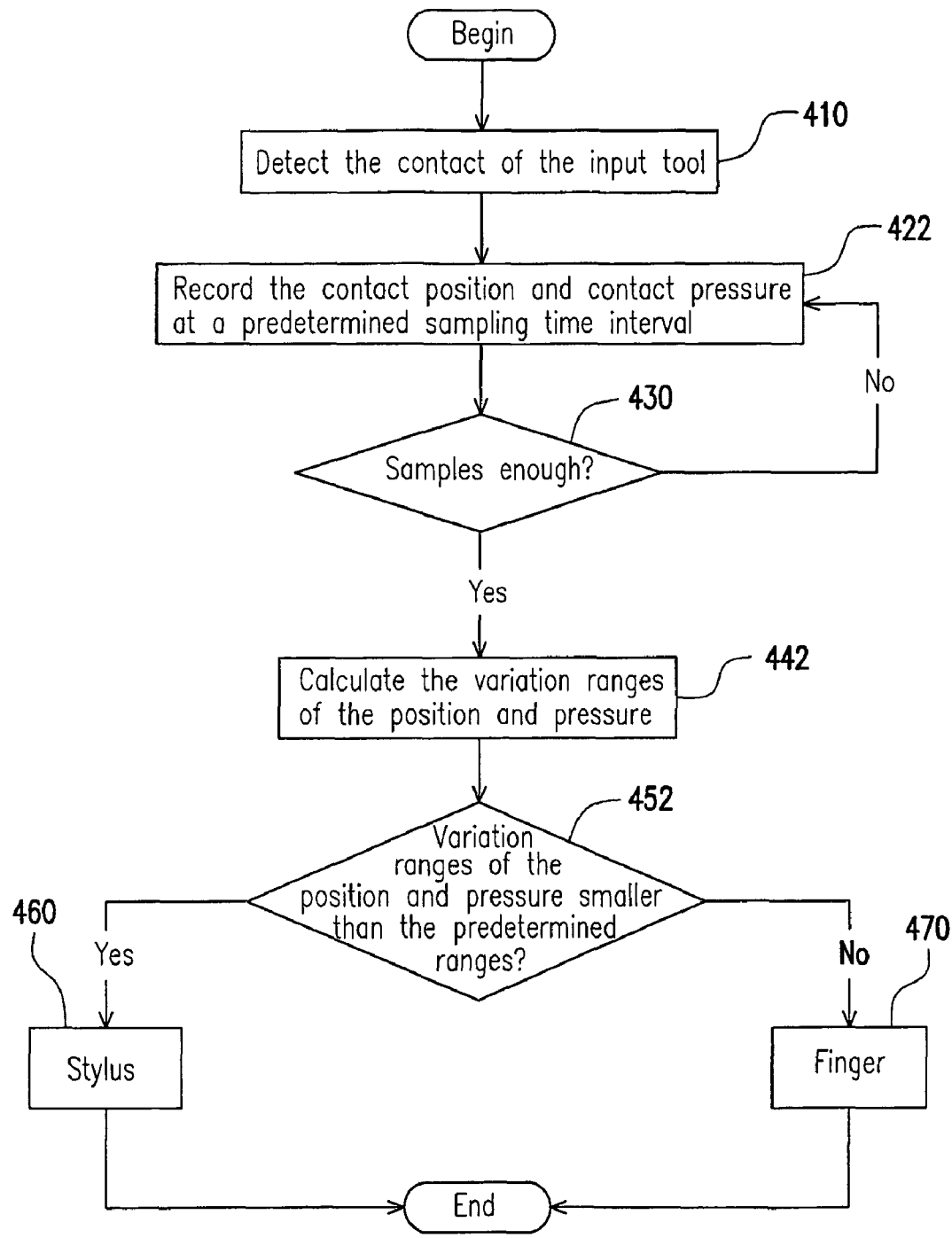

Variation range of the X coordinate: $X_d=|X_a-X_1|+|X_a-X_2|+|X_a-X_3|+|X_a-X_4|$ Variation range of the Y coordinate: $Y_d=|Y_a-Y_1|+|Y_a-Y_2|+|Y_a-Y_3|+|Y_a-Y_4|$ Variation range of the contact pressure: $P_d=|P_a-P_1|+|P_a-P_2|+|P_a-P_3|+|P_a-P_4|$ The flow charts shown in FIG. 4A to FIG. 4C are related to the details about how to identify the type of the input tool according to the variation ranges of the position and the pressure. The details are discussed below.

FIG. 4A is a flow chart of the method for identifying the type of an input tool executed by the processor 230 in FIG. 2A. The flow in FIG. 4A identifies the type of the input tool according to the variation range of the contact position. First, at step 410, detect the contact of the input tool. At step 420, record the X, Y coordinates of the contact points at a predetermined sampling time interval. Next, at step 430, check whether the number of samples is enough. If the number of samples satisfies the predetermined threshold of the processor 230, the flow enters step 440. Otherwise the flow returns to step 420 to keep sampling.

Next, at step 440, calculate the variation ranges Xd and Yd of the contact position. At step 450, check whether Xd<Vx and Yd<Vy, wherein Vx and Vy are the predetermined ranges of the processor 230. If both the variation ranges of the two coordinates are smaller than the corresponding predetermined ranges, the processor 230 determines at step 460 that the type of the input tool is stylus and switches the user interface to a corresponding general user interface. Otherwise the processor 230 determines at step 470 that the type of the input tool is finger and switches the user interface to a corresponding frequently used function interface.

FIG. 4B is the flow chart of another method for identifying the type of the input tool executed by the processor 230. The flow in FIG. 4B identifies the type of the input tool according to the variation range of the contact pressure. At step 421, the processor 230 records the contact pressure of the input tool at a predetermined sampling time interval. At step 441, calculate the variation range Pd of the contact pressure. Next, at step 451, check whether Pd<Vp, wherein Vp is the predetermined range of the processor 230. If Pd<Vp, the processor 230 determines at step 460 that the type of the input tool is stylus and switches the user interface to a corresponding general user interface. Otherwise the processor 230 determines at step 470 that the type of the input tool is finger and switches the user interface to a corresponding frequently used function interface. The other steps in FIG. 4B are the same as their counterparts in FIG. 4A. Therefore there is no need for repeated discussions here.

FIG. 4C is the flow chart of another method for identifying the type of the input tool executed by the processor 230. The flow in FIG. 4C identifies the type of the input tool according to the variation ranges of the contact position and the contact pressure at the same time. At step 422, the processor 230 records the contact position and the contact pressure of the input tool at a predetermined sampling time interval. At step 442, calculate the variation ranges Xd, Yd of the contact position and the variation range Pd of the contact pressure. Next, at step 452, check whether Xd<Vx, Yd<Vy, and Pd<Vp. If all these inequalities are true, the processor 230 determines at step 460 that the type of the input tool is stylus and switches the user interface to a corresponding general user interface. Otherwise the processor 230 determines at step 470 that the type of the input tool is finger and switches the user interface to a corresponding frequently used function interface. The other steps in FIG. 4C are the same as their counterparts in FIG. 4A. Therefore there is no need for repeated discussions here.

Figure 2B:
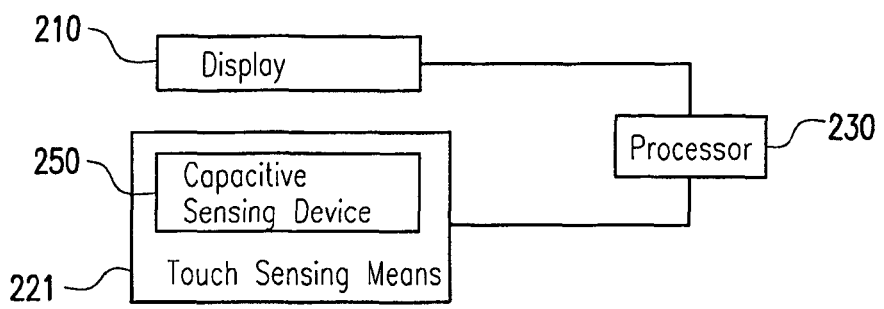

Next, a method for identifying the type of the input tool carried out by another hardware design is discussed. Please refer to FIG. 2B and FIG. 5. FIG. 2B is a block diagram of a handheld device according to another embodiment of the present invention. The major difference between FIG. 2B and FIG. 2A is replacing the touch sensing means 220 in FIG. 2A with the touch sensing means 221 including a capacitive sensing device 250. A capacitive sensing device includes a number of sensing pads arranged in a matrix. A sensing pad generates capacitive effect and detects the contact or approaching of a conductor only when the conductor is large enough in size. A finger is a conductor large enough for a sensing pad to detect it. If a stylus is made with conductor and is sufficiently large, the sensing pad can detect it, too. Generally a capacitive sensing device detects the input tool in a scanning manner. Consequently the input tool may be detected by several sensing pads in the same time or in a very short duration. The processor 230 in FIG. 2B is able to calculate the size of the contact area according to the number of sensing pads which detect the input tool and then identify whether the input tool is a finger or a stylus.

Figure 5:
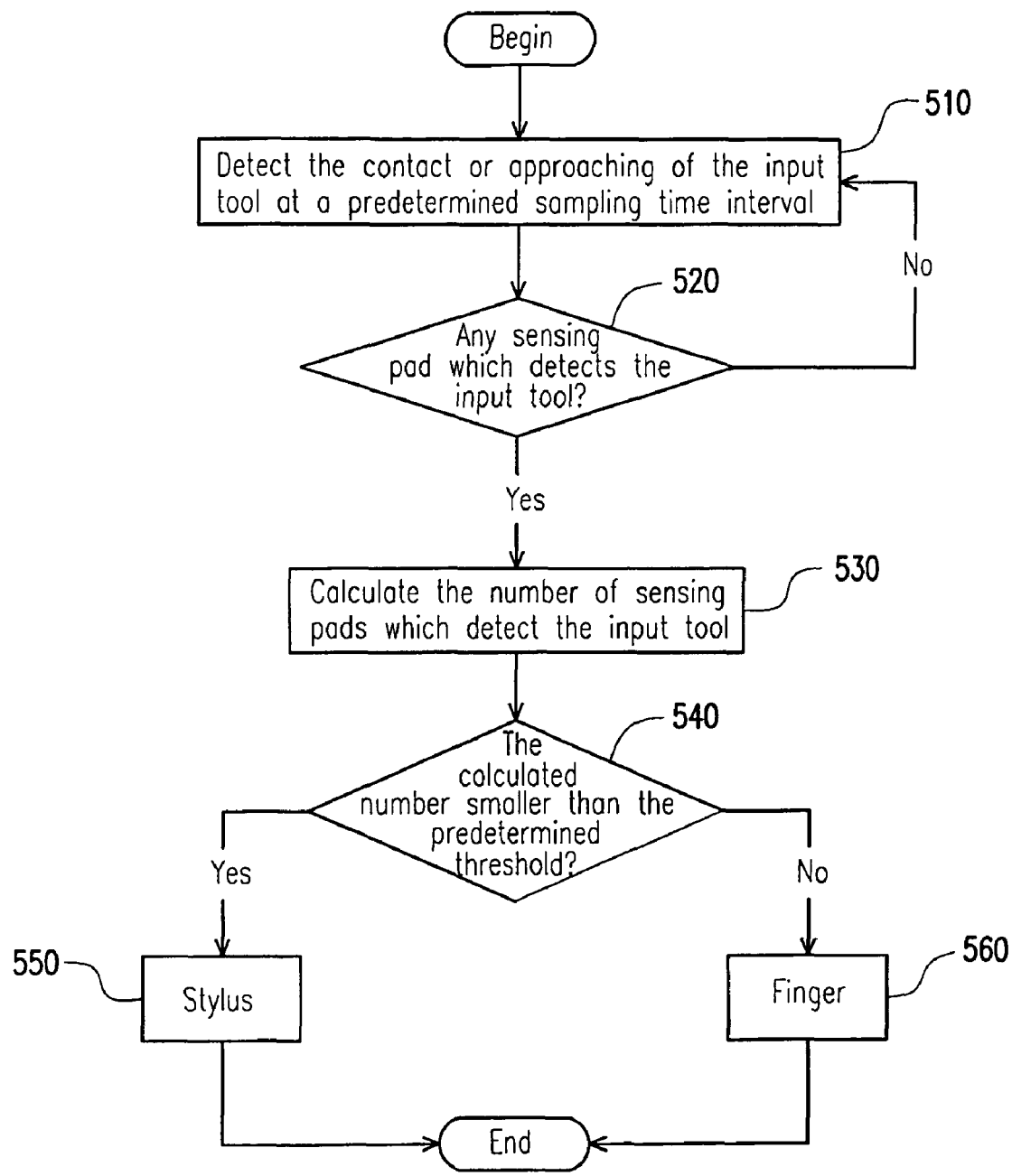
FIG. 5 is a flow chart of a method for identifying the type of an input tool according to another embodiment of the present invention.

FIG. 5 is a flow chart of a method for identifying the type of the input tool executed by the processor 230 in FIG. 2B. First, at step 510, detect the contact or approaching of the input tool at a predetermined sampling time interval. Next, at step 520, check whether there is any sensing pad which detects the input tool. If there is no such sensing pad, the flow returns to step 510 to keep detecting. If there is at least one sensing pad which detects the input tool, the flow enters step 530 to calculate in a predetermined specific duration the number of sensing pads of the capacitive sensing device 250 which detect the input tool when the input tool is operating on the touch sensing means 221. Next, at step 540, check whether the aforementioned number of sensing pads is smaller than the predetermined threshold of the processor 230. If it is, the processor 230 determines at step 550 that the type of the input tool is stylus and switches the user interface to a corresponding general user interface. Otherwise the processor 230 determines at step 560 that the type of the input tool is finger and switches the user interface to a corresponding frequently used function interface. The aforementioned predetermined threshold may be set according to the area density of the sensing pads.

Figure 2C:
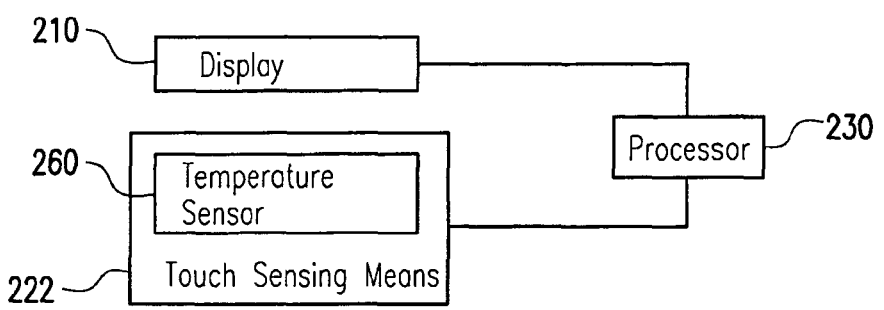

FIG. 2C is a block diagram of a handheld device according to another embodiment of the present invention. The major difference between FIG. 2C and FIG. 2A is replacing the touch sensing means 220 in FIG. 2A with the touch sensing means 222 including a temperature sensor 260. In this embodiment, the processor 230 identifies the type of the input tool according to the temperature of the input tool when the input tool contacts with or approaching the touch sensing means 222. Please refer to FIG. 1 and FIG. 2C. When a user operates on the touch sensing means 222 with an input tool, the processor 230 receives a corresponding input signal (step 110). At this moment, the processor 230 detects the temperature of the input tool through the temperature sensor 260 and compares the temperature of the input tool with a predetermined temperature (such as the average of the room temperature and the body temperature). If the temperature of the input tool is lower than the predetermined temperature, the processor 230 determines that the type of the input tool is stylus. Otherwise the processor 230 determines that the type of the input tool is finger (step 120). Next, the processor 230 displays a corresponding general user interface or frequently used function interface on the display 210 according to the type of the input tool, as discussed in the previous embodiments of the present invention (step 130).

Figure 2D:
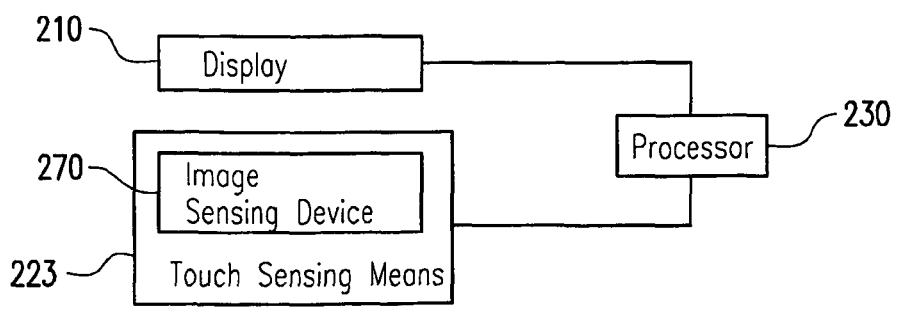

Except identifying the type of the input tool by means of difference in contact area, contact pressure, and contact temperature, in the embodiment of the present invention shown in FIG. 2D, the processor 230 may utilize image recognition techniques in order to identify the type of the input tool. Please refer to FIG. 1 and FIG. 2D. FIG. 2D is a block diagram of a handheld device according to another embodiment of the present invention. The major difference between FIG. 2D and FIG. 2A is replacing the touch sensing means 220 in FIG. 2A with the touch sensing means 223 including an image sensing device 270. At step 110, when a user operates on the touch sensing means 223 with an input tool, the processor 230 receives an input signal through the touch sensing means 223. Next, at step 120, the processor 230 controls the image sensing device 270 to obtain an image including the input tool and identifies the type of the input tool according to the features or dimension of the input tool in the image. For example, the processor 230 may extract features such as edge contours of the input tool in the image by image recognition techniques and then identify the type of the input tool according to the extracted features. Besides, the processor 230 may calculate the dimension of the input tool in the image and identify the type of the input tool by comparing the dimension of the input tool with a reference dimension. If the processor 230 determines that the type of the input tool is stylus, the processor 230 displays the general user interface on the display 210 at step 130. If the processor 230 determines that the type of the input tool is finger, the processor 230 displays the frequently used function interface on the display 210 at step 130.

Figure 6:
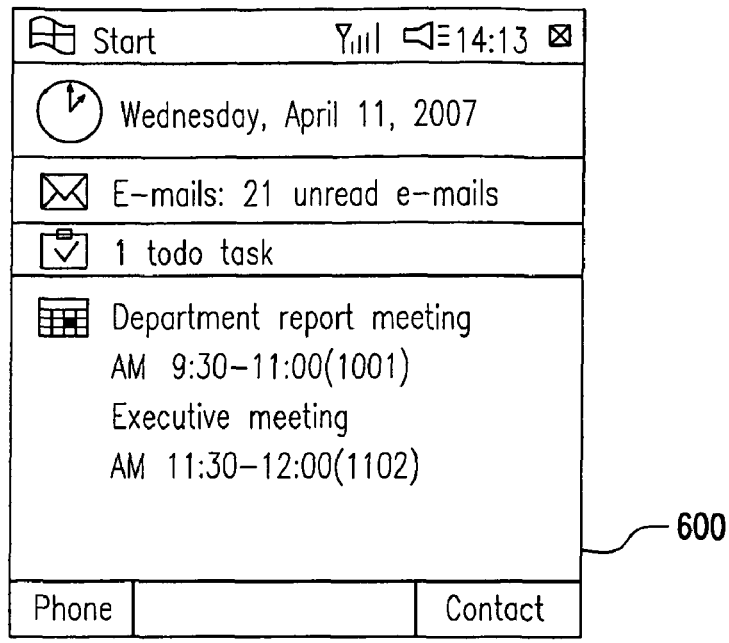
FIG. 6 and FIG. 7 are schematic diagrams showing the user interfaces of a handheld device according to an embodiment of the present invention.
Figure 7:
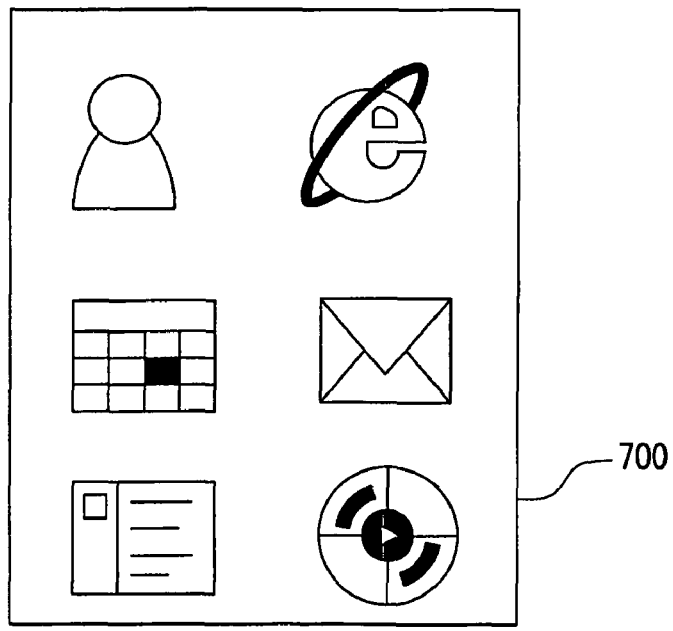

Please note that the processor in a handheld device may adjust the dimension of the items of the user interfaces according to the type of the input tool when switching and displaying user interfaces. For example, when the processor determines that the input tool is a stylus, the items of the user interface are displayed in normal dimension, as shown by the user interface 600 in FIG. 6. However, when the processor determines that the input tool is a finger, the items of the user interface are enlarged to finger-operable dimension so that the user can operate the user interface with a finger at ease, as shown by the user interface 700 in FIG. 7. The aforementioned items include virtual objects which can be selected by an input tool, such as icons or images.

Figure 8A:
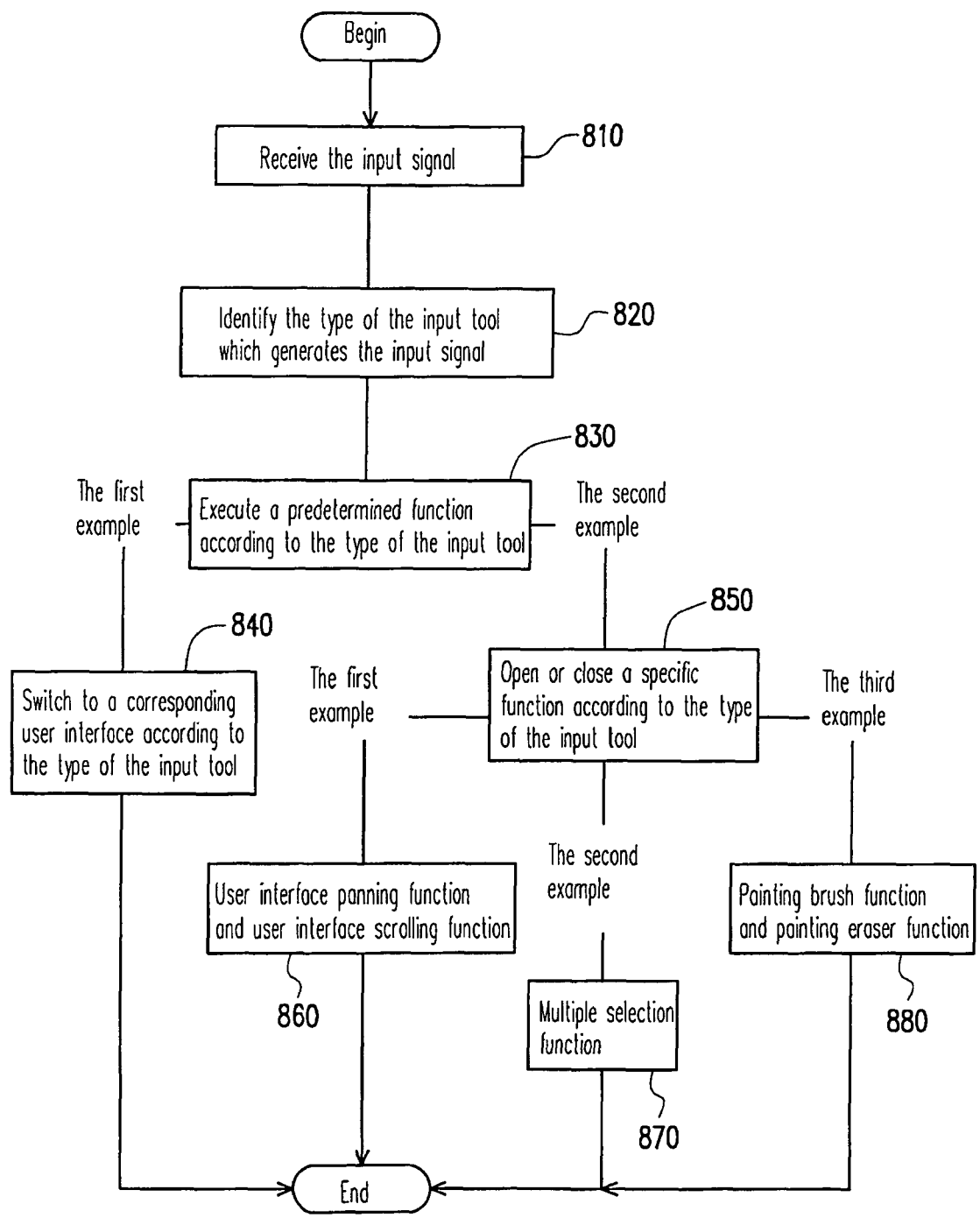
FIG. 8A to FIG. 8C are flow charts of a method for operating a user interface according to an embodiment of the present invention.

Except switching to different user interfaces according to the type of the input tool, the handheld device in the present invention may execute various predetermined functions in various ways according to the type of the input tool, as shown in the flow in FIG. 8. FIG. 8 is a flow chart of a method for operating a user interface executed by a handheld device according to an embodiment of the present invention. The flow is discussed in details as follows. First, the processor of the handheld device receives an input signal through a touch sensing means (step 810), and then identifies the type of the input tool which generates the input signal (step 820), and then executes a predetermined function according to the type of the input tool (step 830). For example, the predetermined function may be switching to a corresponding user interface according to the type of the input tool (step 840). The details of step 840 are already discussed in the previous embodiments. Therefore there is no need for repeated discussions here. Besides, the predetermined function of step 830 may be opening or closing a specific function according to the type of the input tool (step 850). The scope of the present invention is not limited to the predetermined functions shown in FIG. 8. In other embodiments of the present invention, the processor may execute other predetermined functions according to the type of the input tool.

The specific function of step 850 may be a user interface panning function, a user interface scrolling function, or both the user interface panning function and the user interface scrolling function (step 860). For example, the user interface panning and scrolling functions may be closed when the input tool is a stylus and be opened when the input tool is a finger so that the user can pan or scroll the display contents of the user interface by moving his or her finger.

Figure 8B:
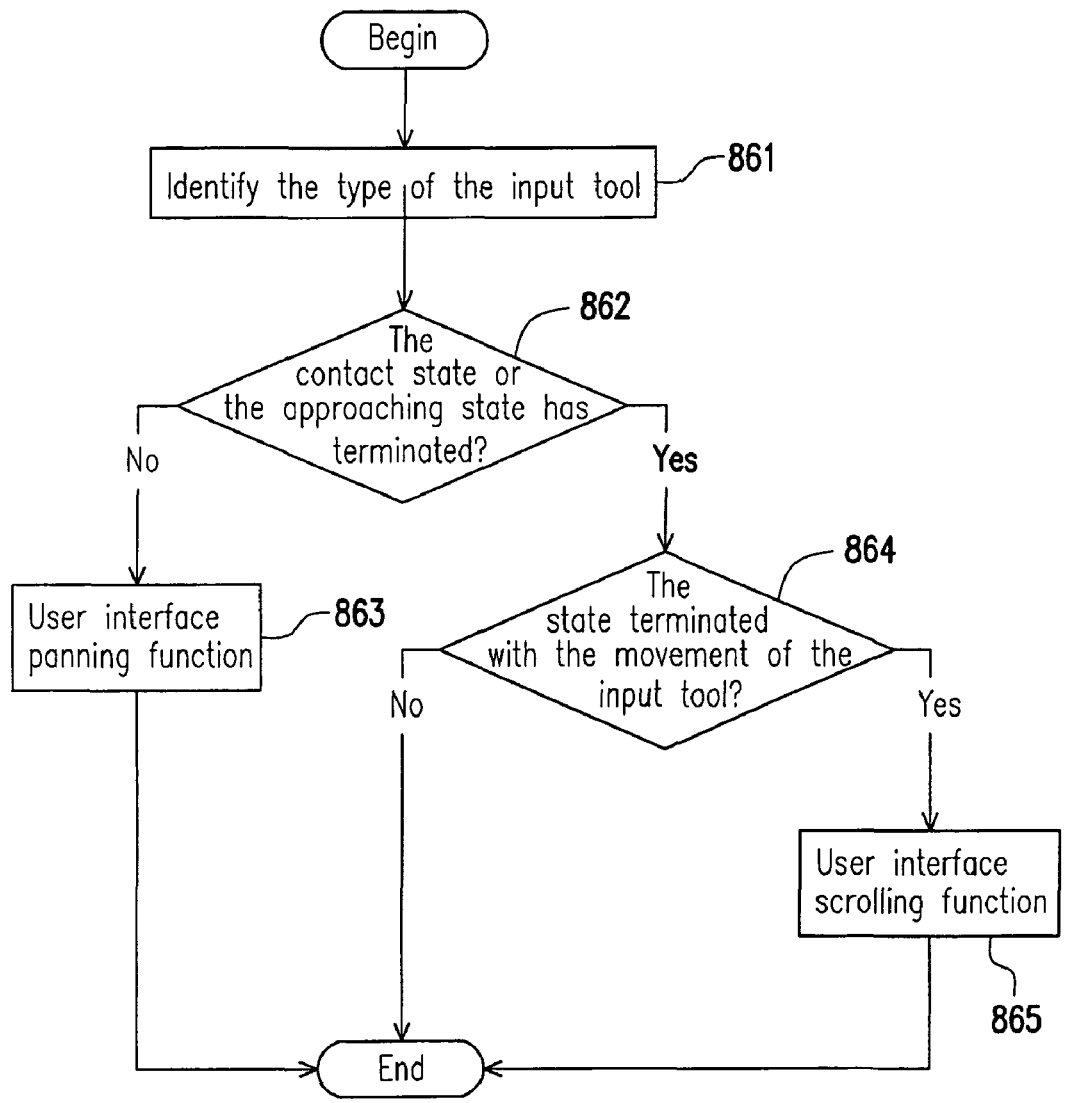

The details of step 860 are shown in FIG. 8B. First, at step 861, the input tool is identified as a finger and the user interface panning function and the user interface scrolling function are opened. At step 862, check whether the contact state or the approaching state of the finger has terminated or not. In other words, check whether the finger has left the touch sensing means. If the finger have not left yet, execute the user interface panning function at step 863 so that the user interface pans with the movement of the finger. On the other hand, if the finger has left the touch sensing means, check whether the finger moves when leaving the touch sensing means or not at step 864. If the finger did not move, the flow terminates. If the finger moved, the flow enters step 864 to execute the user interface scrolling function so that the user interface scrolls with the movement of the finger.

In addition, the specific function of step 850 may be a multiple selection function (step 870). For example, the multiple selection function may be opened when the input tool is a stylus so that the user can select multiple data items or function items in the user interface at the same time with a stylus. Furthermore, the multiple selection function may be closed when the input tool is a finger so that the user can only select one item at a time. Since a finger is not as precise as a stylus and is more prone to erroneous selection, such a design improves the precision and efficiency of using a handheld device.

Figure 8C:
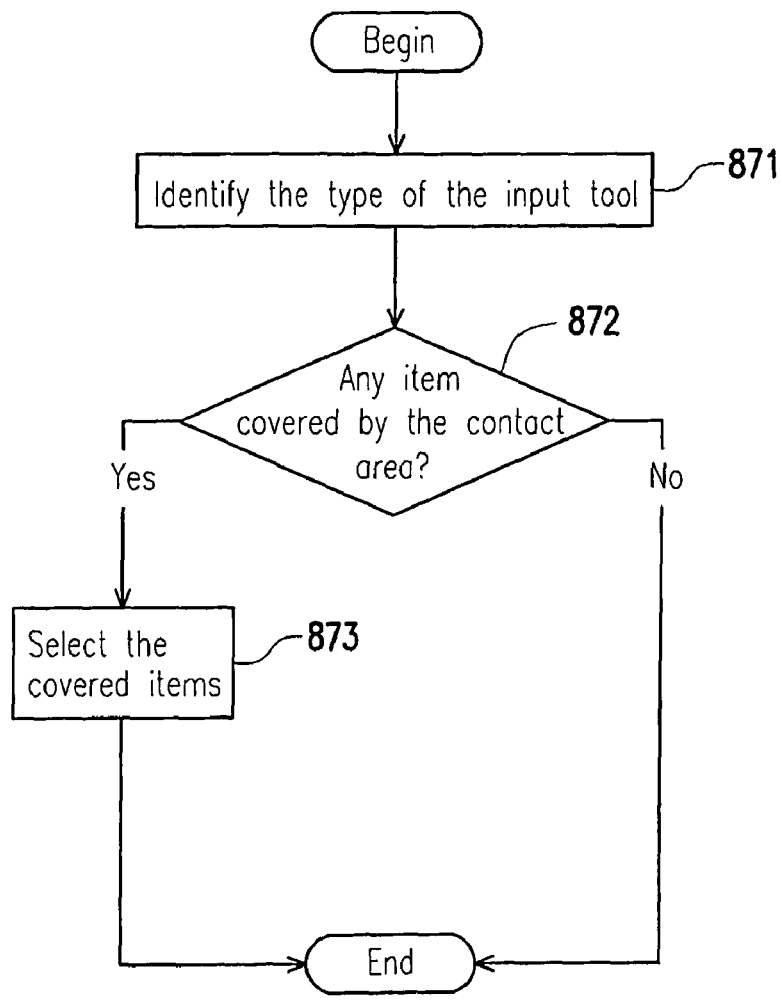

The details of step 870 are shown in FIG. 8C. First, at step 871, the input tool is identified as a stylus and the multiple selection function is opened. Next, at step 872, check whether the area of the contact or approaching of the stylus with the touch sensing means covers any user interface item or not. If the area does not cover any item, the flow terminates. If the area covers at least one item, select all the user interface items covered by the contact area at step 873.

Furthermore, the specific function of step 850 may include a painting brush function and a painting eraser function (step 880). For example, when the input tool is a stylus, the painting brush function may be opened and the painting eraser function may be closed so that the user can paint a picture with the stylus. On the other hand, when the input tool is a finger, the painting brush function may be closed and the painting eraser function may be opened so that the user can use one of his/her fingers as an eraser and erases the previously painted picture.

Besides, the processor may open or close specific functions other than those enumerated in the previous examples according to the type of the input tool.

The scope of handheld devices in the previous embodiments of the present invention may be extended to cover existing electronic devices. The flows of the methods in the previous embodiments may be executed by operating systems or applications of handheld devices or electronic devices in order to integrate functions of hardware such as electronic devices. The aforementioned operating systems or applications may be stored in computer-readable mediums and may be executed by processors of electronic devices. Since the technical details are already discussed in the previous embodiments, there is no need for repeated discussions here.

In the embodiments of FIG. 2A to FIG. 2D, the display and the touch sensing means are two independent components. The display is for displaying user interfaces while the touch sensing means is for receiving input signals. In other embodiments of the present invention, the display and the touch sensing means may be integrated into a touch display, as shown in FIG. 9A and FIG. 9B.

Figure 9A:
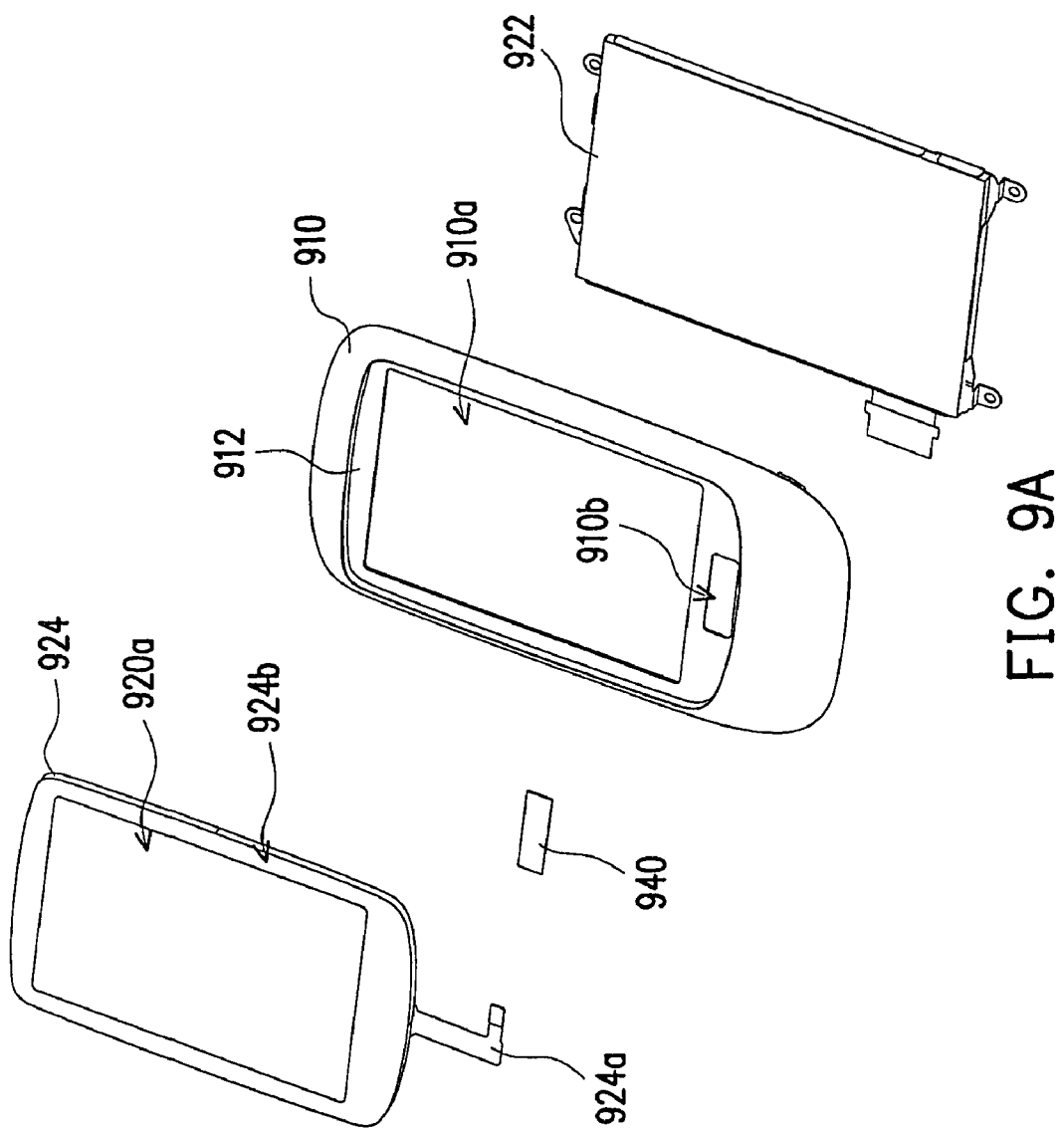
FIG. 9A is a schematic diagram showing an electronic device according to an embodiment of the present invention.
Figure 9B:
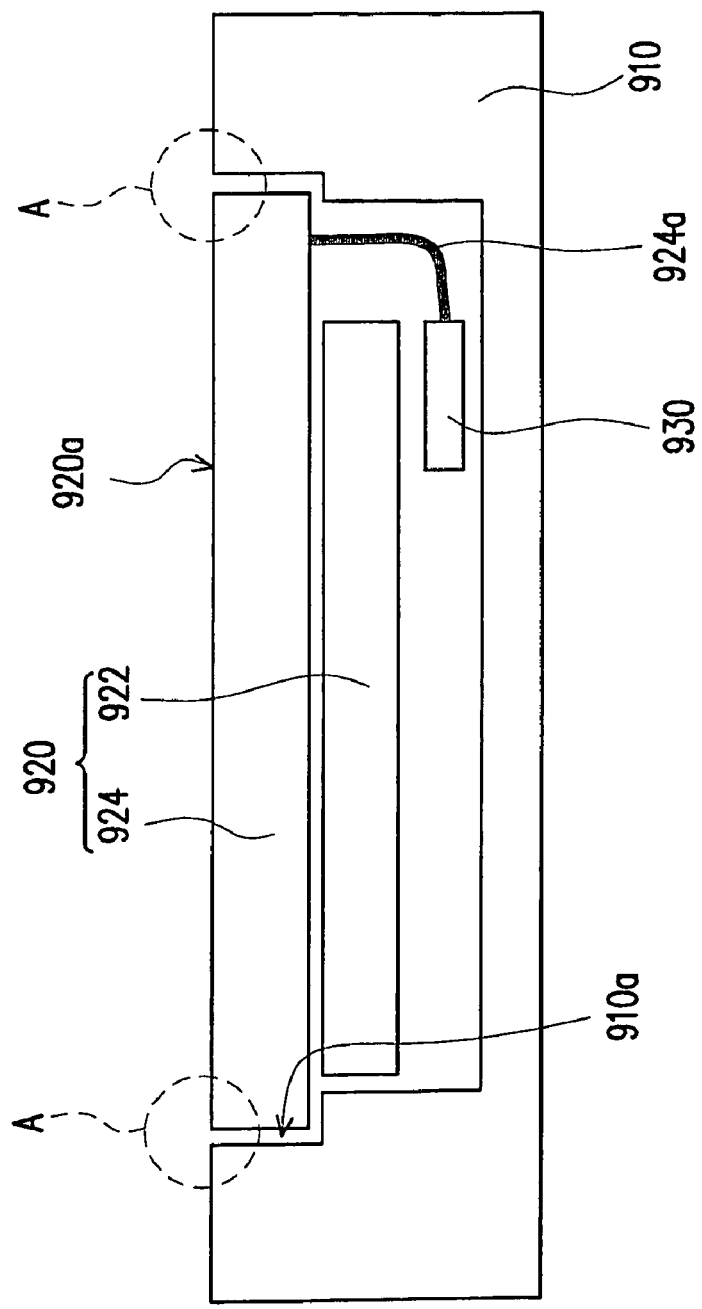
FIG. 9B is a cross-sectional view of the electronic device in FIG. 9A.
Figure 9C:
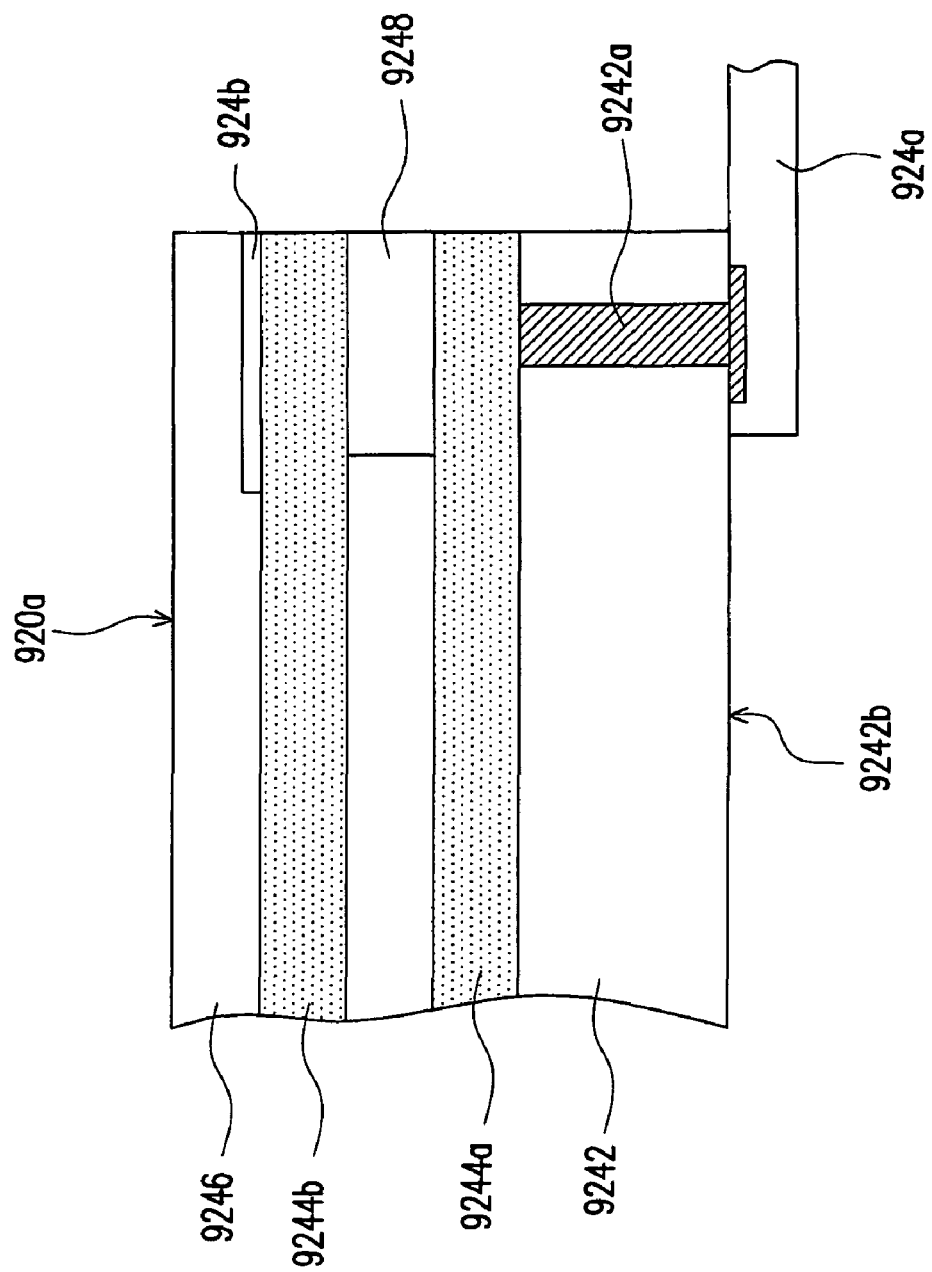
FIG. 9C is a cross-sectional view of the touch sensing means in FIG. 9A.
Figure 9D:
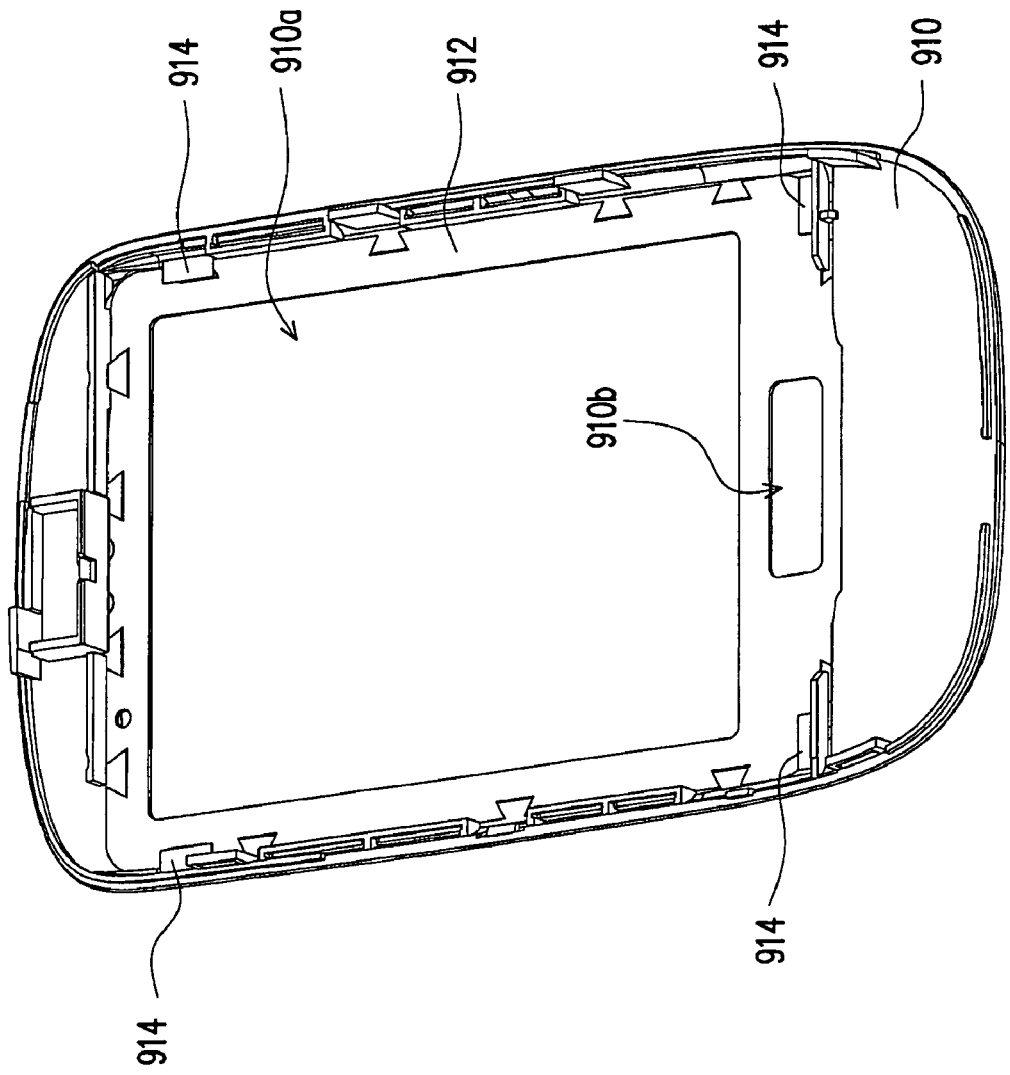
FIG. 9D is a 3D view of the back of a part of the casing in FIG. 9A.

FIG. 9A is a schematic diagram showing an electronic device according to an embodiment of the present invention. FIG. 9B is a cross-sectional view of the electronic device in FIG. 9A. FIG. 9C is a cross-sectional view of the touch sensing means in FIG. 9A. FIG. 9D is a 3D view of the back of a part of the casing in FIG. 9A. Please refer to FIG. 9A and FIG. 9B first. The electronic device includes a casing 910, a touch display 920, and a processor 930. The casing 910 has an opening 910a which connects to the outside. The touch display 920 is disposed in the opening 910a and receives the operation of an input tool. The input tool may be a stylus or a finger of the user. Moreover, the touch sensing means 920 has a sensing surface 920a and the input tool is able to slide across the joint of the sensing surface 920a and the casing 910 smoothly (as shown by region A in FIG. 9B). For example, the difference of height between the sensing surface 920a and the casing 910 at the edge of the opening 910a is no more than a predetermined range so that the input tool is able to slide across the joint of the sensing surface 920a and the casing 910 smoothly. For example, the predetermined range may be between 1 millimeter and 0 millimeter. In this embodiment, the sensing surface 920a is substantially coplanar with the casing 910 at the edge of the opening 910a. In other words, the sensing surface 920a and the casing 910 at the edge of the opening 910a are equivalent to a single smooth surface so that the input tool can move and operate without hindrance. Consequently this electronic device may be regards as an electronic device with a no-hindrance sensing surface or as an electronic device with a smooth sensing surface.

The processor 930 is electrically coupled to the touch display 920 for identifying the type of the input tool. As discussed in the previous embodiment, the processor 930 may identify the type of the input tool according to the area, pressure, temperature, or image detected when the input tool is operating the touch sensing means 924. Similarly, for different ways of identification, the touch sensing means 924 may include a resistive sensing device or a capacitive sensing device. In addition, the touch display 920 may include a temperature sensor or an image sensing device for obtaining an image including the input tool. The related details such as the flow of identification and the execution of predetermined functions are already discussed previously. Therefore there is no need for repeated discussions here. Please note that although the method for displaying different user interfaces may choose a user interfaces according to the type of the input tool, the determining method for displaying different user interfaces is not limited to the determining method discussed above. Besides, the result of identification about the type of the input tool is not limited to be used only for determining the user interface to be displayed. For example, the processor may determine to drive other programs or execute other actions according to the result of identification.

In this embodiment, the touch display 920 includes a display 922 and a touch sensing means 924. The display 922 and the touch sensing means 924 may be independent components or modules. However, in other embodiments of the present invention, the display 922 and the touch sensing means 924 may be incorporated into a single module. Besides, each of the display 922 and the touch sensing means 924 is electrically coupled to the processor 930. In this embodiment, the display 922 is disposed in the casing 910. The touch sensing means 924 is disposed on the casing 910 and covers the opening 910a. In addition, the touch sensing means 924 is disposed over the display 922 and the touch sensing means 924 has a sensing surface 924a for receiving the operation of an input tool. In this embodiment, the display 922 and the touch sensing means 924 are disposed on the two sides of the casing 910 respectively. However, in other embodiments of the present invention, the display 922 and the touch sensing means 924 may be disposed below the casing 910 as well. Some of the components are discussed in details as follows.

Please refer to FIG. 9A and FIG. 9C. The touch sensing means 924 includes a transparent substrate 9242, a first conductor film 9244a, a second conductor film 9244b, a protective layer 9246, and at least one spacer 9248. The first conductor film 9244a is disposed over the transparent substrate 9242, while the second conductor film 9244b is disposed over the first conductor film 9244a. In this embodiment, the first conductor film 9244a and the second conductor film 9244b may be made with indium tin oxide (ITO) or other transparent conductor material. The protective layer 9246 is disposed over the second conductor film 9244b and the protective layer 9246 includes the sensing surface 920a. In addition, for enhancing the aesthetic level of the electronic device, the protective layer 9246 may include a light-blocking portion 924b. The light-blocking portion 924b may cover the parts of the electronic device which are not intended to be seen by the user, such as wires and circuits, the edge of the display 922, or other components. Besides, the spacer 9248 is disposed between the first conductor film 9244a and the second conductor film 9244b in order to separate the first conductor film 9244a and the second conductor film 9244b.

In this embodiment, the touch sensing means 924 further includes several electrodes 9242a and a flexible circuit board 924a. The electrodes 9242a penetrate the transparent substrate 9242 and are electrically connected to the first conductor film 9244a and the second conductor film 9244b respectively. In addition, the flexible circuit board 924a is disposed on a lower surface 9242b of the transparent substrate 9242 and is electrically connected to the electrodes 9242a and the processor 930. In other words, the flexible circuit board 924a extends from under the touch sensing means 924. However, in other embodiments of the present invention, the flexible circuit board 924a may be electrically connected to the first conductor film 9244a and the second conductor film. 9244b without the connection of the electrodes 9242a. In the case that the flexible circuit board 924a extends from the first conductor film 9244a and the second conductor film 9244b, the transparent substrate 9242 of the touch sensing means 924 does not include the electrodes 9242a. Because the flexible circuit board 924a extends from under the touch sensing means 924, the sensing surface 920a and the casing 910 at the edge of the opening 910a are better situated to form a single smooth surface so that the input tool can move and operate without hindrance.

Please refer to FIG. 9A and FIG. 9D. In order to improve the structural strength of the casing 910, the casing 910 further includes a metal plate 912 which is disposed over the periphery of the display 922. In addition, the metal plate 912 supports the touch sensing means 924. However, in another embodiment, the casing 910 may be simply made with plastic without the metal plate 912. Furthermore, in order to avoid the metal plate 912 becoming electrically floating metal and adversely affecting the touch sensing means 924, the casing 910 may include several grounding contacts 914. The grounding contacts 914 may be disposed between the metal plate 912 and the display 922, and be electrically connected between the metal plate 912 and the display 922. In other words, the grounding contacts 914 are disposed on the back of the casing 910 and the metal plate 912 may be grounded through the grounding contacts 914 to the ground terminal of the display 922. However, in other embodiments of the present invention, the metal plate 912 may be grounded through the grounding contacts 914 to the ground terminal of another component of the electronic device, such as the ground terminal of the main circuit board of the electronic device (not shown). Because the metal plate 912 is possible to contact with the display 922, there is usually a layer of black buffer layer or buffer adhesive tape (not shown) adhering to the metal plate 912.

Please note that the touch sensing means 924 includes the electrodes 9242a and the electrodes 9242a are slightly extrusive above the lower surface 9242b of the transparent substrate 9242. As a result, when the touch sensing means 924 is disposed on the casing 910, the touch sensing means 924 is prone to malfunction due to imbalance. To solve this problem, an opening 910b may be formed on the casing 910 or the metal plate 912 in order to contain the extrusive electrodes 9242a. Besides, in order to improve the reliability of the touch sensing means 924, the electronic device may include a pad 940 disposed between the flexible circuit board 924a under the electrodes 9242a and the casing 910. In this embodiment, the pad 940 is disposed over the black buffer layer or buffer adhesive tape in the opening 910b. The flexible circuit board 924a under the electrodes 9242a contacts with the pad 940. However, the pad 940 may adhere to the touch sensing means 924 or the casing 910.

In summary, the present invention is able to identify the type of the input tool and switch to the corresponding user interface or execute various predetermined functions in various ways according to the type of the input tool. As a result, the present invention not only provides a method for rapidly switching different user interfaces but also enables the users to operate handheld devices in a more convenient way, thus improving the efficiency and user friendliness of using handheld devices.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An electronic device with a sensing function with no-hindrance touching, comprising:
   a casing having an opening;
   a touch display disposed in the opening for receiving an operation of an input tool, wherein the touch display comprises:
   a display disposed in the casing;
   a touch sensing means disposed over the display and in the opening, and the touch sensing means has a sensing surface, and the input tool can slide across the joint of the sensing surface and the casing without hindrance, wherein the touch sensing means comprises:
   a transparent substrate;
   a first conductor film disposed on the transparent substrate;
   a second conductor film disposed over the first conductor film;
   a plurality of electrodes penetrating the transparent substrate and respectively electrically connected to the first conductor film or the second conductor film; and
   a flexible circuit board disposed on a lower surface of the transparent substrate and electrically connected to the electrodes and the processor; and
   a processor electrically coupled to the flexible circuit board of the touch sensing means and the display of the touch display, wherein the processor determines a user interface displayed on the touch display,
   wherein the processor records a plurality of contact values in a specific duration, each of the contact values is a contact coordinate or a contact pressure detected when the input tool operates the touch display, the processor calculates an average of the contact values in the specific duration, calculates a variation range of the contact values in the specific duration according to differences between the contact values and the average, and then identifies a type of the input tool according to a size of the variation range.

2. The electronic device of claim 1, wherein the method by which the processor determines the user interface displayed on the touch display comprises the processor identifying the type of the input tool and switching to the corresponding user interface according to the type of the input tool.

3. The electronic device of claim 2, wherein the input tool comprises a stylus or a finger of a user.

4. The electronic device of claim 1, wherein the difference of height between the sensing surface and the casing at an edge of the opening is limited to a predetermined range.

5. The electronic device of claim 4, wherein the predetermined range is between 1 millimeter and 0 millimeter.

6. The electronic device of claim 1, wherein the sensing surface and the casing at an edge of the opening are substantially coplanar.

7. The electronic device of claim 1, wherein the touch sensing means further comprises:
   at least one spacer disposed between the first conductor film and the second conductor film; and
   a protective layer disposed on the second conductor film, wherein the protective layer has a light-blocking portion and the sensing surface.

8. The electronic device of claim 1, further comprising a pad disposed between the flexible circuit board under the electrodes and the casing.

9. The electronic device of claim 1, wherein the casing further has a metal plate and a plurality of grounding contacts, the metal plate is disposed over the periphery of the display, the grounding contacts are disposed between the metal plate and the display and are electrically connected between the metal plate and the display.

10. The electronic device of claim 1, wherein the touch sensing means comprises a resistive sensing device or a capacitive sensing device.

11. The electronic device of claim 1, wherein the touch display comprises a temperature sensor or an image sensing device for obtaining an image including the input tool.

12. An electronic device with a sensing function with no-hindrance touching, comprising:
   a casing having an opening;
   a touch display disposed in the opening for receiving an operation of an input tool, wherein the touch display comprises:
   a display disposed in the casing;
   a touch sensing means disposed over the display and in the opening, and the touch sensing means has a sensing surface, and the input tool can slide across the joint of the sensing surface and the casing without hindrance, wherein the touch sensing means comprises:
   a transparent substrate;
   a first conductor film disposed on the transparent substrate;
   a second conductor film disposed over the first conductor film;
   a plurality of electrodes penetrating the transparent substrate and respectively electrically connected to the first conductor film or the second conductor film; and
   a flexible circuit board disposed on a lower surface of the transparent substrate and electrically connected to the electrodes and the processor; and
   a processor electrically coupled to the flexible circuit board of the touch sensing means and the display of the touch display and configured for identifying a type of the input tool,
   wherein the processor records a plurality of contact values in a specific duration, each of the contact values is a contact coordinate or a contact pressure detected when the input tool operates the touch display, the processor calculates an average of the contact values in the specific duration, calculates a variation range of the contact values in the specific duration according to differences between the contact values and the average, and then identifies the type of the input tool according to a size of the variation range.

13. The electronic device of claim 12, wherein the processor further comprises determining a user interface display on the touch display according to the type of the input tool.

14. The electronic device of claim 12, wherein the difference of height between the sensing surface and the casing at an edge of the opening is limited to a predetermined range, wherein the predetermined range is between 1 millimeter and 0 millimeter.

15. The electronic device of claim 12, wherein the sensing surface and the casing at an edge of the opening are substantially coplanar.

16. The electronic device of claim 12, wherein the touch sensing means further comprises:
   at least one spacer disposed between the first conductor film and the second conductor film; and
   a protective layer disposed on the second conductor film, wherein the protective layer has a light-blocking portion and the sensing surface.

17. The electronic device of claim 12, wherein the input tool comprises a stylus or a finger of a user.

* * * * *